Figure 1:
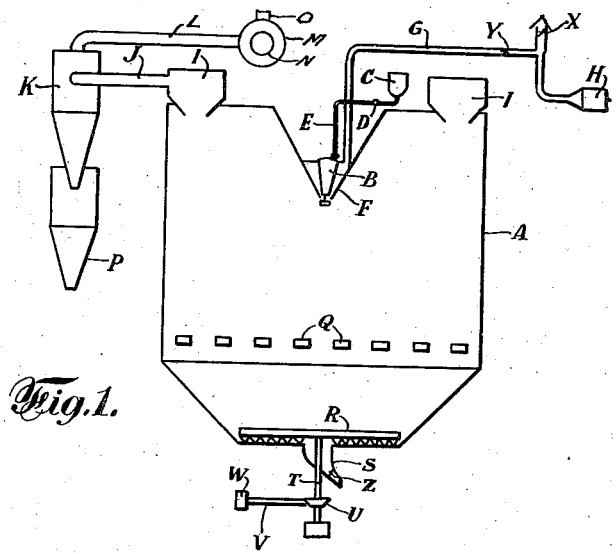

March 2, 1937.  A. B. JONES  2,072,263
PROCESS AND APPARATUS FOR PRODUCING COMMINUTED SULPHUR
Filed Jan. 13, 1933

INVENTOR.
Arthur B. Jones
BY Kenyon & Kenyon
ATTORNEYS.

Patented Mar. 2, 1937

2,072,263

UNITED STATES PATENT OFFICE 2,072,263

PROCESS AND APPARATUS FOR PRODUCING COMMINUTED SULPHUR

Arthur B. Jones, New York, N. Y., assignor to Industrial Associates, Inc., New York, N. Y., a corporation of New York Application January 13, 1933, Serial No. 651,512

2 Claims. (Cl. 83—91)

This invention relates to the preparation of sulphur in comminuted form and has for an object a process of and apparatus for expeditiously and economically preparing comminuted sulphur and regulating the size of the sulphur particles.

The process and apparatus employed by me consists in subjecting a stream of molten sulphur to centrifugal action, causing the fluid to separate into small particles and while subjected to this action to first heat the nebulized zone of particles near the centrifugal atomizer and then chill them by cooled air or gases which causes the small particles of sulphur to come down as a fine powder. An important detail in the centrifugal dispersion of the molten sulphur is the introduction of a small amount of hot air or gases immediately around the centrifugal atomizer not only to heat the parts of the machine coming in contact with the molten sulphur, to prevent sulphur adhering to the parts, but also to regulate the size and form of the particles before they reach the chilling action of the cooling air or gases. This retarding of the chilling action of the atomized sulphur by small amount of hot air or gases allows the atomized particles to become further separated and formed before coming in contact with the chilling action of the cooled air or gases. This gives better form to the chilled sulphur particles and also smaller particles and prevents them from adhering to each other.

The process is effected in a preferably cylindrical, square or rectangular closed chamber into the center of which the molten sulphur is introduced by means of a centrifugal atomizer. The form of the chamber into which the sulphur is atomized is not essential and the results of chilling the atomized sulphur may be obtained in the open air if proper circulation of the air is obtained but the process so conducted is less economical and the particle size of the chilled sulphur is not so uniform. The size of the chamber and the circulation of the cool air or gases should be proportioned so that the molten sulphur subjected to centrifugal action shall not hit the walls until the particles are sufficiently chilled to prevent them from adhering to the walls or to each other.

A feature of my process and apparatus is the separation of the particles of different size. By maintaining a certain velocity through the apparatus, the coarser particles deposit in the main cooling chamber while the finer particles are carried over into one or more dust collectors. Three or more grades of fine sulphur particles may thus be obtained in the same apparatus which will obviate screening or other means of classification.

Fine sulphur, if it is colloidal or near-colloidal has extensive use in the manufacture of insecticides, rubber, medicine, etc. Heretofore, it has been the practice to produce sulphur in a colloidal or near-colloidal form by sublimation or grinding, both of which methods are expensive. As practically all the sulphur in this country is taken out by melting it under the ground with steam or super-heated steam and then pumping it to the surface it may, in this melted condition, be transformed into fine particles instead of running it into bins to cool into solid sulphur. If the cost of transportation of the fine comminuted sulphur is too great, the sulphur on account of its low specific heat may be melted at the point of consumption and converted into fine particles by means of my process and apparatus.

Sulphur melts at the temperature of 238° F. to 320° F. and becomes fluid so that it may be atomized by means of nozzles or mechanical atomizers. Below or above 238° to 320° C., it becomes viscid. If it is desirable to produce a particle approximately spherical in form, the liquid sulphur should be maintained between 238° C. and 320° C. If, on the other hand, a particle is desired to be in shredded form instead of spherical, the liquid sulphur should be atomized above or below the temperature of 238° C. or 320° C., preferably a temperature below 238° C. as the quicker cooling of the shredded sulphur takes place before it has time to assume a spherical form. In the production of the spherical form of very fine sulphur (colloidal or near-colloidal), I find an advantage in introducing a small amount of heated air or gases immediately around the atomizer. In producing the shredded particles of sulphur, the advantage of using the heated air around the atomizer is not so marked. In this case, the quantity of heated air brought into the chilling chamber should be reduced sufficiently to maintain the proper temperature on the spray bowl to prevent sulphur adhering to it in case mechanical atomization is used. If a nozzle or nozzles are used, the hot air introduced into the chilling chamber may be entirely eliminated.

It is here to be mentioned that in the description of my apparatus, and in the drawing hereto annexed, I disclose the chamber as circular; whereas, a square, rectangular or other form of chilling chamber may be used. If the circulation of the hot air close to the atomizer and proper circulation of the chilling air is obtained in the open air without a chamber, the chamber may be omitted if economy of operation is not essential and a separation of the fine and coarser particles is not required.

In the drawing—

Figure 2:
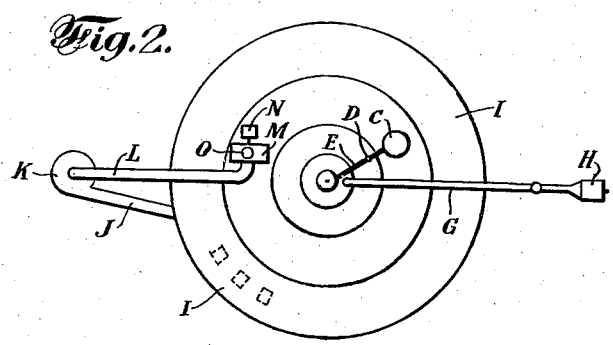
Figure 3:
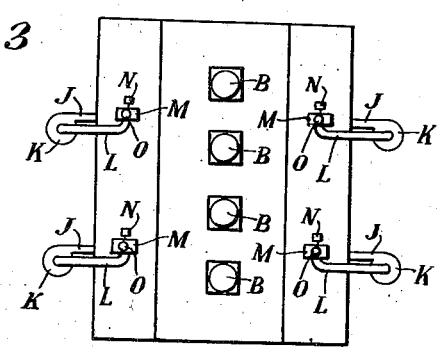

Figure 1 is a central vertical section of my preferred apparatus. Figure 2 is a plan of my apparatus. Figure 3 is a plan of a chilling plant with four atomizers and a cross-section of this unit would be as in Figure 1.

Referring to the drawing, A represents the chilling tower which may be circular in section as shown in plan Figure 2, square in section and if two or more atomizers are to be used rectangular in section as shown in Figure 3. B is the mechanical atomizer by means of which the molten sulphur is atomized. In place of the mechanical atomizer, a nozzle or nozzles may be substituted but I prefer a mechanical atomizer such as shown in U. S. Patents 1,732,110 and 1,779,296. The atomizer as shown is a turbine steam-driven machine which is also made as illustrated but may be operated with an electric motor instead of steam turbine drive. As referred to previously, the mechanical atomizer may be replaced with a nozzle or nozzles. C is a pot with a steam jacket, or otherwise heated pot, in which the sulphur is melted. D is a valve regulating the quantity of melted sulphur run into the atomizer. E is a pipe carrying the molten sulphur from the pot to the atomizer. This pipe should have a steam jacket around it or small steam pipe inside the pipe through which the sulphur flows, to keep it at the proper temperature. F is a metal cone around an atomizer which allows a small annular opening around the circular shell of an atomizer at its lowest extremity. G is a metal duct carrying hot air into the cone F and H is the air heater. The air heater as shown is an oil or gas-fired heater using products of combustion for economy of fuel or it may be a steam air heater using steam radiator coils for heating the air or even a heat transferer type of heater in case coal, wood or other combustible fuel is used. I is a duct around top of tower through which the chilling gases are drawn. J is a duct leading from the main duct to a dust collector. K is a dust collector which is shown as a cyclone or super-cyclone or may be any kind of dust collector such as known on the market as Multiclone, filter cells, bag collector, Cottrell electrical precipitators, etc. L is a duct connecting the dust collector to an induced draft fan. M is a fan used for exhausting air from the chamber. N is a motor driving the fan. O is an exhaust exit. P is a hopper for the dust collector and supplies means of removing fine dust from the dust collector. Q are inlet openings for air into the main chilling chamber. R is a slow-moving rake for removing the product collected at the bottom of the chamber. S is the discharge hopper and spout for collecting the fine product raked into it by the rake R. T is a shaft on which the rake R is mounted and by means of which it is turned. U is a gear connected to shaft T and pinion V. W is the motor operating the discharge rake.

Having described the apparatus, the method of operation is as follows: The molten sulphur as it comes from the Herman Frasch type of sulphur wells or cold brimstone is introduced into a feed pot (steam jacketed or otherwise heated) and heated at melting temperature of 238° F. to 320° F. High pressure live steam is necessary on the jacket to obtain these temperatures so the melting pot has to be built to withstand a pressure of 80 to 90 pounds per square inch. If the melting pot is heated by gas or waste heat gases, a jacket, of course, is not necessary. The molten sulphur is run through the pipe E into the atomizer B and the flow of molten sulphur regulated by means of the valve D. Before the molten sulphur is run into the atomizer B, the motor N which drives the fan M is started up to put in circulation the chilling air through the entire system. Also the oil or gas is lit in the air heater H which supplies a small quantity of hot air immediately around the atomizer B by the duct G and the cone F. When combustion is properly obtained in the air heater H, the damper X is closed allowing all air to pass into the chilling chamber and the damper Y opened. I have found that the quantity of hot air necessary is not over 10% of the total gases circulated through the system.

Through the ports Q inside of chilling chamber, the large quantity of cool air (outside air) is drawn in by fan M. The cold air is drawn in together with a small amount of hot air, sufficient only to keep the sulphur from adhering to wheel. The small quantity of hot air also allows the atomized sulphur particles to travel a distance from wheel so when the chilling process starts, the particles are far enough separated from each other so they will not stick together.

Motor W is also started in order to circulate the rake R. A small amount of powdered sulphur is allowed to always remain above the damper Z to prevent air rushing in the spout S and prevent collection of the product produced.

Atomizer B is now started which should run 9,000 to 10,000 R. P. M. if it is similar in design as shown in U. S. Patents 1,732,110 and 1,779,296. Valve G is opened to allow the molten sulphur to run into the atomizer. Due to the low specific heat of sulphur, 70 pounds of fluid sulphur run into the atomizer per minute will require from 1,000 to 2,000 cubic feet of cool air per minute for chilling the atomized particles if the outside air is 70° F. or lower. If the outside air is higher than 70° F., a correspondingly increased quantity of air is required depending on its temperature. Motor M, therefore, must handle not only 2,000 cubic feet per minute but at least 10% more than this to handle also the hot gases entering around the atomizer. I have found also that openings Q should have slides so that proper adjustment of cold and hot air may be made by opening Q slides and also adjusting damper Y. I have also found, due to difficulty of adjusting slide openings Q and damper Y, that it is advisable with inexperienced operators to place a fan with a variable speed motor at the place where the damper Y is located. This additional motor makes a more positive regulation of hot and cold air but makes slightly more expensive plant and less economically operating apparatus.

After the fluid sulphur is properly atomized and the hot and cold air is circulated, the finest particles of chilled sulphur are collected in dust collector K and then discharged into the hopper P and thus collected. The coarser particles are collected in the bottom of the main chilling chamber and are raked out by the rake R into the spout S and collected.

If it is desirable to vary the size of the particles, it is accomplished by increasing or decreasing the speed of the atomizer. The higher the speed of the centrifugal atomizer wheel, the smaller the particle size of the chilled sulphur and the slower the wheel speed, the larger are the particles. If the majority of the particles are very small, the dust collector K will receive a greater portion of the small particles of the total product produced and a small portion of the large particles will be thrown down in the main chamber A. If the particle size of the chilled sulphur is large, the greater portion of the large particles of the product produced in the apparatus will come down in the main chamber A and a small portion of the fine particles produced will come down in dust collector K.

The particles of chilled sulphur produced from sulphur heated to a temperature approximately 238° F. to 320° F. are at its maximum fluidity and will be round in form. These particles in the round form will be more free-flowing than if the particles were irregular in form. For certain purposes, it is desirable to produce a chilled sulphur irregular in form such as short fibres or shredded pieces. I have found that chilled sulphur in shredded form may be made in the apparatus described, by holding the temperature of the sulphur treated at a point where it is viscid as it leaves the centrifugal atomizer. Sulphur a little below 238° F. is viscid and may still be run into the atomizer to produce the chilled sulphur shredded in form. When producing this shredded form, I have found it desirable to reduce very much the quantity of hot air or gases around the atomizer or eliminate all hot air or gases entirely. By atomizing the sulphur also at a temperature above 320° F., it is viscid and a shredded form particle may be produced. When producing the chilled sulphur at this high temperature, the reduction of the temperature of the hot gases brought in around the atomizer is not so necessary although the shredded form of particles may be produced with or without the introduction of hot air or gases.

I have disclosed the preferred process and apparatus of practicing my invention and in doing so, I do not desire to be limited except by the scope of the appended claims. I do not intend, by any means, to confine myself to the preparation of sulphur alone, but contemplate that the process and apparatus may be used to prepare other materials similar to sulphur in comminuted form.

Where an electrical precipitator is used as a dust collector, the fine particles are all charged either positively or negatively so that the particles tend to repel each other and thus prevent packing or caking of the particles into a mass.

I claim:

1. An apparatus of the class described comprising a chamber having inlet ports in its lower portion, a centrifugal sprayer in the upper portion of said chamber, a casing surrounding the major portion of said sprayer, means for supplying molten material to said sprayer, means for supplying hot gases to said casing, and exhaust means connected to the upper portion of said chamber and including a duct surrounding said casing.

2. The process of preparing sulphur and like material in comminuted form which comprises centrifugally spraying molten material, passing the sprayed particles into contact with hot gas in a first zone surrounding said spray source and then into contact with cool gas in a second zone surrounding said first zone, continuously supplying hot gas to said first zone to maintain said zone substantially at the melting temperature of said material, continuously supplying cool gas to said second zone to maintain said zone at the solidifying temperature of said material and continuously withdrawing gas simultaneously from both zones thereby maintaining each zone at substantially constant temperature.

ARTHUR B. JONES.